J. J. SHOEMAKER.
STREET CAR FENDER.
APPLICATION FILED APR. 4, 1918.
1,283,928.
Patented Nov. 5, 1918.
2 SHEETS—SHEET 1.
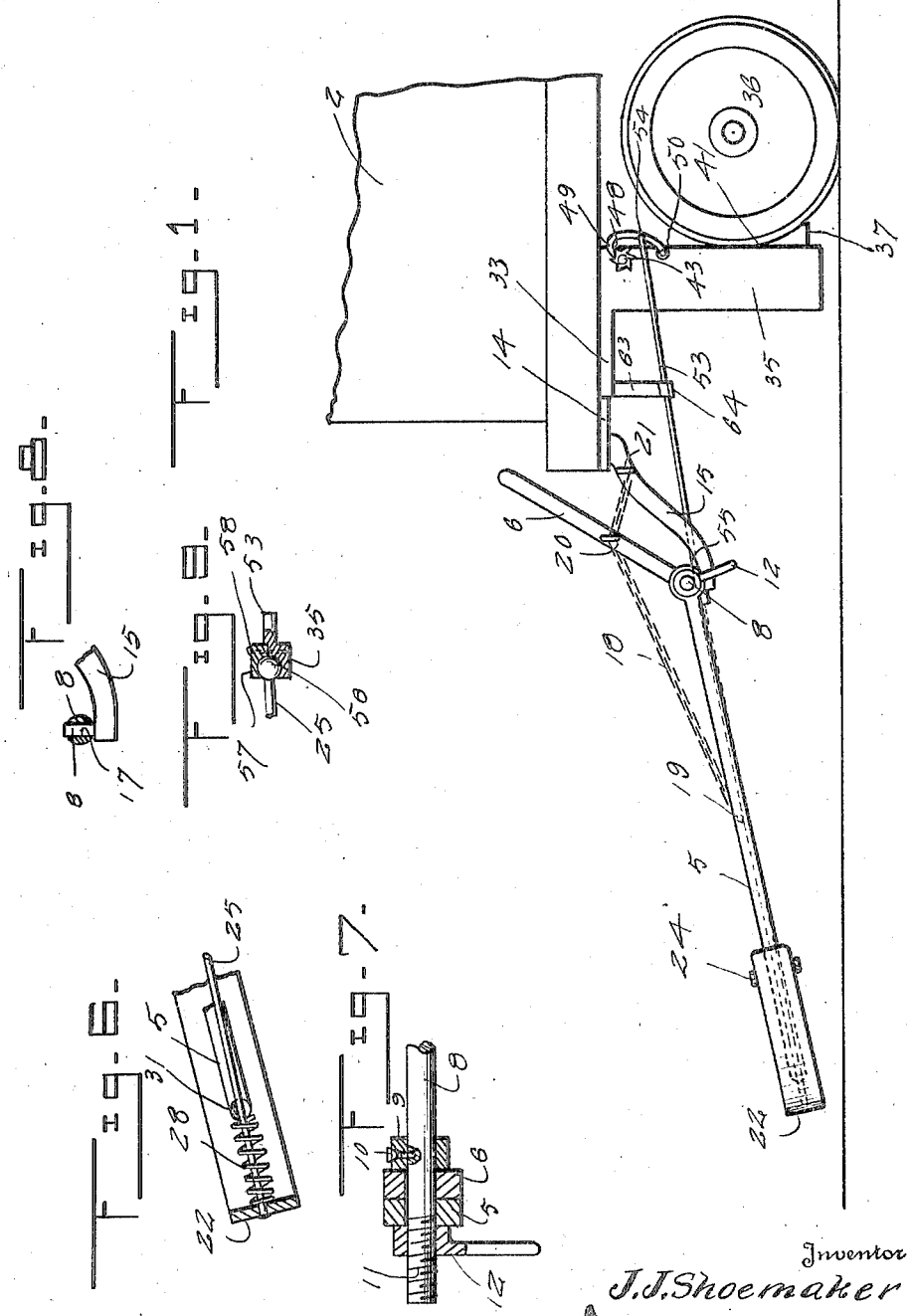
Inventor
J. J. Shoemaker

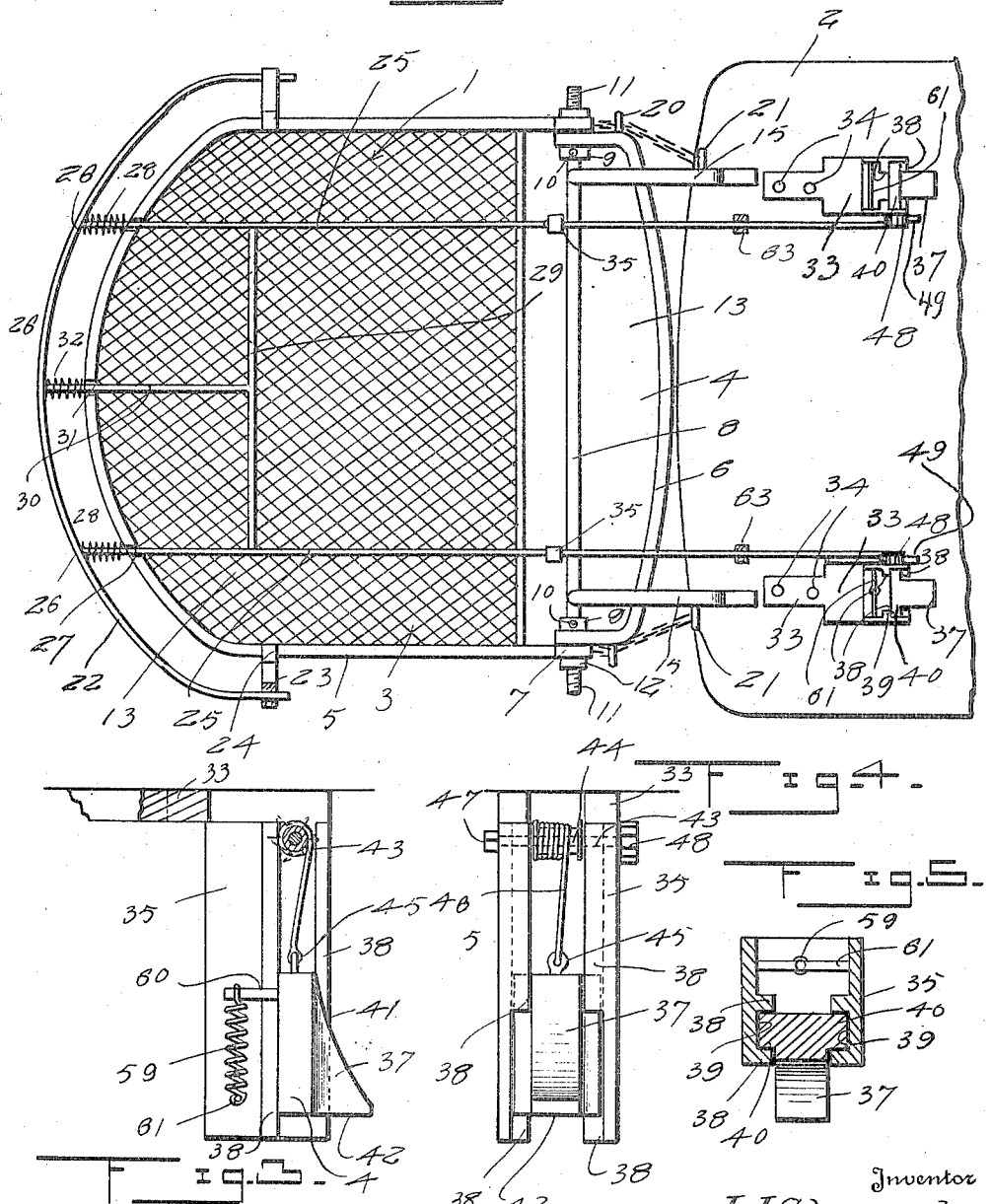

UNITED STATES PATENT OFFICE.

JAMES J. SHOEMAKER, OF QUINCY, ILLINOIS.

STREET-CAR FENDER.

1,283,928.  Specification of Letters Patent.  Patented Nov. 5, 1918.

Application filed April 4, 1918. Serial No. 226,716.

*To all whom it may concern:*

Be it known that I, JAMES J. SHOEMAKER, a citizen of the United States, residing at Quincy, in the county of Adams and State of Illinois, have invented certain new and useful Improvements in Street-Car Fenders; and I do hereby declare the following to be a full, clear, and exact description of the invention, such as will enable others skilled in the art to which it appertains to make and use the same.

This invention relates to fenders and more particularly to street car fenders and the primary object of the invention is to provide an improved street car fender, which will not permit an object to ride under the same, and which will when striking an object automatically apply the brakes so as to stop the forward motion of the car.

Another object of the invention is the provision of an improved street car fender having means for preventing the same from riding upward when striking an object so as to prevent the object from passing beneath the fender and under the wheels.

A further object of the invention is the provision of an improved street car fender which will, when striking an object, automatically drop chucks in front of the car wheels so as to stop the travel of the car and thus prevent injury to the object.

A further object of the invention is the provision of chucks automatically actuated by the fender when striking a body which will fall in front of the car wheels, so as to stop travel of the car and form a guard for preventing the body from coming in contact with the car wheels, in case the body should pass beneath the fender.

A further object of the invention is the provision of an improved street car fender having a spring pressed plate slidably mounted on the forward portion of the fender, said fender carrying a rearwardly extending rod which is connected to the slidably mounted plate and to the car wheel chucks, the plate and rod being so arranged that when the plate is forced rearwardly by coming in contact with an object the rod will be operated so as to automatically release the car chucks so as to position the same in front of the car wheels.

A still further object of the invention is the provision of an improved street car fender of the above character, which is durable and efficient in use, that is simple and easy to manufacture, and one that can be placed upon the market at a reasonable cost.

With these and other objects in view, the invention consists in the novel construction, arrangement, and formation of parts, as will be hereinafter more specifically described, claimed and illustrated in the accompanying drawings, forming a part thereof, in which:—

Figure 1 is a fragmentary side elevation of a street car showing the improved fender applied thereto, Fig. 2 is a bottom plan view of the improved fender attached to a street car, Fig. 3 is a side elevation partly in section of the car wheel chucks and guide, showing the means for holding the same in elevated position, Fig. 4 is a front elevation of the car chuck and guide, Fig. 5 is a transverse section through the car chuck and guide taken on the line 5—5 of Fig. 4, Fig. 6 is a fragmentary side elevation of the car fender showing the spring pressed brake actuating plate in place, Fig. 7 is a side elevation of the shaft supporting the fender, showing the means for holding the fender in position, to prevent the same from riding upwardly, Fig. 8 is a detail sectional view showing the means securing the fender to the car supporting bracket, and Fig. 9 is a detail sectional view of the means for connecting the operating rod and connecting rod.

Referring to the drawings in detail wherein similar reference numerals designate corresponding parts throughout the several views, the numeral 1 generally indicates the improved fender which is adapted to be secured to a street car 2 of the ordinary or any preferred construction. The fender 1 includes the front platform 3 and the inwardly inclined back piece 4, which is formed relatively smaller than the front platform. The front platform 3 and the back piece 4 are each formed of substantially U-shaped frames 5 and 6 respectively, having the ends of their legs enlarged as at 7, and rotatably mounted on the shaft 8, which extends through the enlarged ends. Collars 9 are keyed as at 10 on the shaft 8, and engage the inner sides of the legs of the U-shaped frame 6 to limit the inward movement of the same. The free ends of the shaft 8 are threaded as at 11 and a tail nut or crank 12 is turned on the same and these tail nuts are adapted to be turned against the ends of the legs of the U-shaped frame 5 to frictionally bind the free ends of the legs of the U-shaped frames 5 and 6 against the nuts 9 and prevent the U-shaped frame 5 from being forced upwardly, when the same hits an object. When it is desired to swing the U-shaped frame 5 upwardly out of the way, when the car is not being used, the tail nuts 12 are rotated away from the ends of the frames so that the frames can be readily rotated on the shaft. Suitable wire netting 13 is provided for each of the U-shaped frames 5 and 6 and provides means for supporting an object. The wire netting 13 is formed in any suitable manner that may be desired. Brackets 14 are bolted to the forward portion of the car 2 and have downwardly extending arms 15 which terminate in upwardly extending projections 16 that are adapted to extend through apertures 17 formed in the shaft 8. These brackets form suitable means for detachably holding the fender in position, and when it is desired to remove the fender from the car, it is simply necessary to lift the fender upwardly to bring the shaft 8 from out of engagement with the projections 16. Any suitable supporting chain 18 is connected to the side of the legs of the U-shaped frame 5 as at 19 and extends upwardly and is connected to the sides of the U-shaped frame 6 as at 20 and is then continued and then extends rearwardly and is connected to suitable hooks 21 formed on the brackets 15. The chain can be readily detached from the hooks 21 when it is desired to remove the fender from the car. A substantially U-shaped actuating plate 22 is positioned on the front portion of the platform 3 of the fender and extends substantially parallel with the forward portion of the fender and has its free ends slidably mounted in brackets 23 which are secured as at 24 to the sides of the legs of the U-shaped frame 5. Rearwardly extending rods 25 are connected as at 26 in spaced relation to each other to the actuating plate 22, and are slidably received in apertures 27 formed in the forward or bight portion of the U-shaped frame 5. Coil springs 28 extend around the rods 25 and are positioned between the actuating plate 22 and the forward or bight portion of the U-shaped frame 5, and these springs normally hold the actuating plate 22 in spaced relation to the front portion of the platform 3. A transverse rod 29 connects the actuating rods 25 so that the same will be actuated for synchronous movement. A central rod 30 is connected to the actuating plate 22 and the rod 29 intermediate the actuating rods 25 and the same extends through an aperture 31 in the forward or bight portion of the frame 5 and has a spring 32 coiled around the same and the spring bears against the actuating plate and the forward portion of the frame, thus when the actuating plate 22 hits an object the plate will be forced rearwardly against the tension of the springs 28 and 32, for a purpose which will hereinafter more fully appear. Spaced supporting brackets 33 are secured to the under side of the car 2 in rear of the fender 1 by bolts 34 and support vertical guideways 35 which are positioned directly in front of the front car wheels 36 of the car. The vertical guideways 35 extend short of the road surface and slidably support car chucks 37. The inner surface of the vertical guideways 35 are provided with spaced inwardly extending ribs 38 on the inner surface of the side walls which form channels 39 for the reception of ribs 40, which are formed on the rear side edges of the car chucks 37. The rear face of the car chuck 37 is curved as at 41 to conform to the curvature of the car wheel so that the same can readily slide beneath the car wheel to check the forward motion of the same. The ribs 38 terminate short of the lower end of the guide ways, so as to let the car chucks drop out of the guide ways, when the chucks are in their lowered position to allow the same to engage the wheels. The lower surface of the chuck 37 is provided with a plain surface 42 for forming a bearing surface to engage the road. Extending transversely across the guideways 35 adjacent to the upper end thereof is a rotatable shaft 43 which has keyed thereto a drum 44. The drum 44 is positioned between the side walls of the guideways 35 and the side walls prevent the lateral movement of the drum. The upper surface of the chuck 37 has secured thereto an eye 45 which has fastened thereto a flexible cable 46 which has its opposite end secured to and coiled around the drum 44. One end of the shaft is provided with a squared end 47 for the reception of a wrench or crank so that the shaft 43 can be readily rotated to wind up the cable 46 for bringing the car chuck 37 upwardly in the guideway 35. The opposite end of the shaft 43 is provided with the ratchet wheel 48 which is keyed thereto and a dog 49 is pivoted at its lower end as at 50 to the upper end of the guideway 35 and engages the ratchet wheel 48 and prevents the rotation of the shaft 43, and holds the car chuck 37 in an elevated position. A connecting rod 53 is secured to the dog 49 intermediate its ends as at 54 and is connected by a suitable universal joint 55 with the free ends of the rods 25.

The rods 25 are provided with spherical terminals 56 which are received in a two part socket 57 carried by each of the connecting rods 53. The parts of the sockets 57 are held together by means of detachable fastening elements 58.

In operation of the improved device, when the fender 1 strikes an object, or hits any portion of the actuating plate 22, the same will be forced rearwardly against the tension of the springs 32 and carry the rods 25 therewith, which will in turn, through the medium of the connecting rods 53 swing the dog 49 on the pivot 50 and bring the same out of engagement with the ratchet wheel 48 which will allow the car chucks 37 to descend by gravity and unwind the cable 46 from the drum 44 and allow the chucks to extend in front of and engage the car wheels 36 and stop the forward motion of the car. The chucks also coming in front of the car wheels form a guard for the object being struck from coming in contact with the wheels in case the body rides under the fender 1. A contractile coil spring 59 is positioned between the side walls of the guideways 35 and has one end connected to the rearwardly extending arm 60 carried by rear of the car chucks 37 and has its lower end connected to a transverse rod 61 which extends between the side walls of the guideways 35 and the coil spring forms a means for positively actuating the car chuck when the dog 49 is forced out of engagement with the ratchet wheel 48. Downwardly extending guides 63 are secured as at 64 to the brackets 34 and slidably receive the connecting rods 53 and forms supports for the same.

From the foregoing description, it can be seen that an improved fender is provided, which will be prevented from riding upwardly when striking an object, and one which will automatically stop the forward motion of the car when the same hits an object.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim as new is:—

1. In a device of the class described, the combination, a car, of a fender therefor including a supporting shaft, having its ends threaded, means securing the shaft to the car, of a pair of U-shaped frames having their free ends rotatably mounted on the shafts, collars keyed to the shaft and engaging the inner sides of the frames, and nuts turned on the free ends of the shafts for engaging the outer sides of the frames to prevent movement thereof.

2. In a device of the class described, the combination, a car including supporting wheels, a fender therefor, vertical guideways secured to the lower surface of the car in front of the wheels, chucks slidably mounted in the guides and arranged to engage the wheels in their lowered position, a shaft rotatably carried by the upper portions of the guideways, a cable coiled around the shaft and engaging the chucks to hold the same in a raised position, a ratchet wheel keyed to the shaft, a dog engaging the ratchet wheel, a spring pressed actuating plate carried by the forward portion of the fender, and rearwardly extending rods connecting the actuating plate and the dog, as and for the purpose specified.

3. In a device of the class described, the combination, a car including supporting wheels therefor, of a fender, an actuating plate slidably carried by the forward portion of the fender, spring means for normally holding the plate in a forward position, guides secured to the lower surface of the car in front of the supporting wheels, chucks slidably mounted in the guide ways and arranged to engage the car wheels, means for releasably holding the chucks in their raised position and out of engagement with the car wheels, and rods secured to the plate extended rearwardly therefrom and operatively connecting the actuating plate and the chuck releasing means, as and for the purpose specified.

In testimony whereof I affix my signature in presence of two witnesses.

JAMES J. SHOEMAKER.

Witnesses:
E. G. BICKHAUS,
L. E. GIESING.